United States Patent Office 3,346,474
Patented Oct. 10, 1967

3,346,474
PHOTOCHEMICAL PROCESS FOR PREPARING ALLENE
Donald P. Gush, Washington, D.C., assignor to W. R. Grace & Co., New York, N.Y., a corporation of Connecticut
No Drawing. Filed Oct. 29, 1964, Ser. No. 407,555
1 Claim. (Cl. 204—162)

ABSTRACT OF THE DISCLOSURE

This invention is directed to a process for preparing allene by subjecting a mixture of methane and ethylene to ultraviolet radiation having a wave length of from 1000–1750 A. and recovering the thus formed allene.

---

The present invention relates to the production of allene, and more specifically to a novel method for preparing allene from inexpensive and readily available raw materials.

Allene (propadiene) having the formula $CH_2=C=CH_2$ has heretofore been prepared by several classical chemical methods such as by reacting 2,3-dibromopropene with zinc dust or by electrolysis of itaconic acid. The thus far suggested methods for preparing allene require the use of relatively expensive chemical intermediates. To date no methods have been developed by which allene may be produced from inexpensive and readily available raw materials.

It is therefore an object of the present invention to provide an improved, more direct method for preparing allene.

It is another object to provide a method by which allene may be produced from inexpensive raw materials.

These and still further objects of the present invention will become readily apparent to one skilled in the art from the following detailed description and/or specific examples.

Broadly, the present invention contemplates a method for producing allene which comprises subjecting mixtures of methane and ethylene to ultra-violet photolysis and recovering the allene formed thereby.

More specifically, I have found that when mixtures of methane and ethylene are subjected to photolysis using a UV wave length irradiation ranging from about 1000 to about 1750 A. units, allene is formed in measurable amounts.

Preferably, the ratio of methane to ethylene ranges from about 10:1 to about 1:10 moles of methane per mole of ethylene. The particular ratio of methane to ethylene is not particularly critical and any ratio selected within the above given limits will yield allene when subjected to the process disclosed herein.

The present photolysis is carried out in vacuum equipment under a vacuum ranging from about 1–2 to about 760 millimeters of mercury. The apparatus in which the present reaction may be conducted is standard vacuum equipment which is capable of containing the mixture of gases to be photolyzed for the time required. The equipment is provided with a suitable window for admitting the required UV irradiation. Standard lithium fluoride windows having a thickness on the order of one millimeter are ideally suited for this purpose.

The photolysis is conducted at a temperature of from about the melting point of ethylene (−169° C.) to about 300° C. Ordinarily, room temperature is entirely suitable for conducting the photolysis reaction. However, any temperatures in the above range will yield the desired result. The time required for the photolysis to occur ranges from about 5 minutes to about 2 to 3 hours using the above temperatures and standard equipment.

The UV light used to carry out the photolysis has a wave length of from 100 to about 1750 A. units. A typically suitable UV radiation of 1236 and 1165 A. is generated by micro-wave discharge through krypton gas maintained at a relatively low pressure, that is on the order of 0.5 to about 20 millimeters of mercury. Other UV wave lengths which may be adapted in the use of the present invention include any which fall within the range of 1000 to about 1750 A.

During the photolysis reaction of the present methane-ethylene mixtures other products are formed such as acetylene, ethane, propane, propylene and hydrogen.

To separate the allene from the reaction mixture, standard chromotographic analytical equipment is utilized. Such equipment may comprise an extended column packed with liquid phases such as squalene, di-2-ethylhexyl sebacate, or bis-2(2-methoxy ethyl) adipate absorbed on Chromosorb P or Chromosorb W. The column is maintained at room temperature to about 80° C. and an inert carrier gas is used to carry the photolysis products through the column. The allene in the mixture is retained in the column for a period of time which may be determined by using a standard allene obtained commercially.

The yields of allene prepared by the present method using the present form of equipment range from about 0.5 to about 1.0% of the total products. Using the above times and temperatures and photolysis techniques, the decomposition of the total methane-ethylene mixture ranges from about 0.1 to about 1%.

Having described the basic aspects of the present invention, the following examples are given to illustrate specific embodiments thereof.

Example I

A mixture comprising one millimeter of Hg pressure of methane and three millimeters of Hg pressure of ethylene (a molar ratio of 1 to 3) was introduced into a previously evacuated Pyrex glass cell having a volume of about 250 cc. The sample was irradiated for 30 minutes with the light transmitted through a cleaved lithium fluoride window (1.0 to 0.5 millimeter thickness) which is generated by a micro-wave discharge through 1.5 millimeter of Hg pressure of krypton gas. Principal vacuum UV wave lengths yielded by this device were 1236 and 1195 A. units. The photolysis reaction mixture was at room temperature during the irradiation. After irradiation a sample of the reaction mixture was subjected to chromatographic analysis using a 30 foot ⅛ inch outside diameter column which was packed with 30% by weight of squalene which is $$[CH_3-\overset{CH_3}{\underset{|}{C}H}-CH_2-CH_2-CH_2-\overset{CH_3}{\underset{|}{C}H}-CH_2-CH_2-CH_2-\overset{CH_3}{\underset{|}{C}H}-CH_2-CH_2-]_2$$

having a formula weight of 422.83 on Chromosorb W (which is a diatomaceous earth flux-calcined with sodium carbonate) or Chromosorb P (which is a calcined diatomaceous earth having high surface area). The sample was subjected to the analysis at a volume of 5.3 cc. and was carried through the column with nitrogen as a carrier gas at a rate of 20 cc. per minute. This technique showed the presence of a product having the same retention time as allene which was previously determined using a known sample. The quantity of allene formed consisted of about 0.5 to 1% of the total products of the reaction. This was determined approximately by dividing the total area under the chromatographic peaks for all products, into the area under the peak corresponding to allene.

Example II

A mixture consisting of 4 millimeter pressure of methane and 4 millimeter pressure of ethylene (a molar ratio of 1 to 1) was photolyzed as described above in Example I. Substantially the same results were obtained.

The above description and examples clearly indicate that allene may be readily obtained using the novel photolysis process described herein.

I claim:

A method for preparing allene, said method comprising;
(a) preparing a mixture of a methane and ethylene, the mole ratio of methane to ethylene in said mixture being about 0.1–10:1;
(b) subjecting said mixture to ultraviolet radiation, said radiation having a wave length of about 1000–1750 A. while maintaining said mixture at a pressure of about 1–760 millimeters of mercury and at a temperature of about −169 to +300° C. in an apparatus having a window for admitting said radiation; and
(c) recovering the thus formed allene.

References Cited
UNITED STATES PATENTS 2,762,768   9/1956   Cier _____ 204—162

ROBERT K. MIHALEK, *Primary Examiner.*

HOWARD S. WILLIAMS, *Examiner.*